A. A. BACKHAUS.
CATALYZER.
APPLICATION FILED JUNE 15, 1918.
1,400,203.
Patented Dec. 13, 1921.
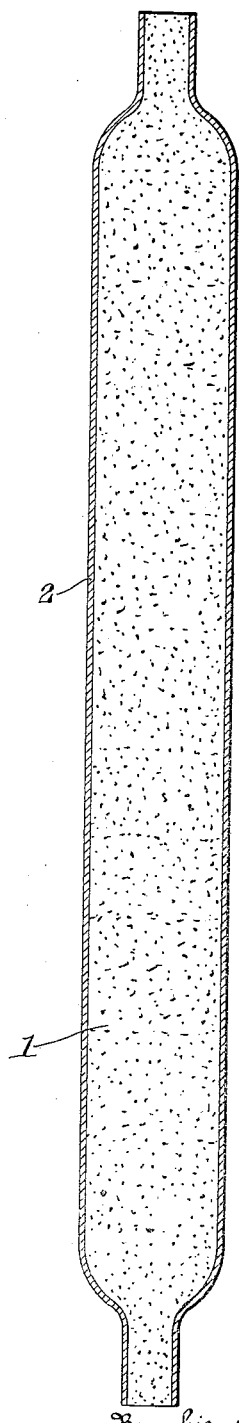

UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

CATALYZER.

1,400,203.  Specification of Letters Patent.  Patented Dec. 13, 1921.

Application filed June 15, 1918. Serial No. 240,222.

*To all whom it may concern:*

Be it known that I, ARTHUR A. BACKHAUS, of Baltimore, in the State of Maryland, have invented a certain new and useful Improvement in Catalyzers, and do hereby declare that the following is a full, clear, and exact description thereof.

My invention relates particularly to a catalyzer which is used in the production of aldehydes.

The object of my invention is to provide a catalyzer by means of which aldehydes may be advantageously made, as for example acetaldehyde, by passing alcohol over a catalyzer of this character while heated.

Another object of my invention is to provide a catalyzer containing a catalyzer metal, such for example, as copper, nickel, chromium or iron, to be used for the production of aldehydes in this way.

Further objects of my invention will appear from the detailed description thereof contained hereinafter.

While my invention is capable of being carried out in many different ways, for the purpose of illustration I shall describe only one form of catalyzer made in accordance with my invention in the accompanying drawings, in which—

The figure is a vertical section of a tube in which the catalyzer is formed in accordance with my invention.

For example, I may add to 50 parts by weight of granular pumice stone, or unglazed porcelain, or charcoal, or terra cotta, which may have a fineness such as to pass through a sieve having 10 meshes to the inch, 50 parts by weight of a catalytic metal nitrate, such for example as cupric nitrate or nickel nitrate ($Ni(NO_3)_2$), or both, dissolved in an equal weight of water. When the absorbent material, such for example as the pumice stone, has absorbed the nitrate, a quantity of ammonia sufficient to precipitate the metal as hydrate is added. This will be approximately the amount of a water solution of ammonia having a strength of 26% equal to one-half the weight of the nitrate added.

The mixture is then dried and ignited to form the metal oxide, which will be contained within and upon the particles of the pumice stone.

The granular catalyzer 1 is then filled into a copper tube 2, and the tube is then heated for several hours at a temperature of 300° C., while a current of hydrogen is being passed through the same over the granular catalyzer, so that, as a result, the metal oxid is reduced to the corresponding finely-divided metal.

These tubes containing the granular catalyzer may be then used in the production of aldehydes, as for example the production of acetaldehyde, by passing ethyl alcohol vapors through the tubes at a temperature between 250° C. and 350° C., the acetaldehyde and hydrogen vapors being carried off for separation in any suitable manner.

By using a tube composed of copper as a container for the granular catalyzer, the catalytic decomposition of the alcohol is increased, since the copper tube itself has a catalytic action.

While I have described my invention above in detail, I wish it to be understood that many changes may be made therein without departing from the spirit of the invention.

I claim:

1. A catalyzer comprising an inert carrier containing a finely divided highly porous catalytic metal free from metallic oxids.

2. A catalyzer comprising a carrier of pumice stone containing a finely divided highly porous catalytic metal free from metallic oxids.

3. A catalyzer comprising an inert carrier having interspersed therethrough small particles of a catalytic metal, said particles each being highly porous and free from other metals or metallic oxids.

4. A catalyzer comprising a carrier of pumice stone containing interspersed therethrough small particles of a catalytic metal, said metal being in a highly porous condition and free from other metals and metallic oxids.

In testimony that I claim the foregoing I have hereunto set my hand.

ARTHUR A. BACKHAUS.

Witnesses:
  JOHN P. GISCHEL,
  ARTHUR WRIGHT.